(12) United States Patent
Karch

(10) Patent No.: US 6,442,537 B1
(45) Date of Patent: Aug. 27, 2002

(54) SYSTEM OF GENERATING AND IMPLEMENTING RULES

(75) Inventor: Robert Karch, Westfield, NJ (US)

(73) Assignee: Teleran Technologies, Inc., Fairfield, NJ (US)

( * ) Notice: Subject to any disclaimer, the term of this patent is extended or adjusted under 35 U.S.C. 154(b) by 0 days.

(21) Appl. No.: 09/338,994

(22) Filed: Jun. 24, 1999

(51) Int. Cl.[7] .............................................. G06F 9/445
(52) U.S. Cl. .............................................. 706/50; 707/2
(58) Field of Search ........................... 56/10.5; 706/50; 707/2

(56) References Cited

U.S. PATENT DOCUMENTS

| | | | |
|---|---|---|---|
| 4,970,658 A | * 11/1990 | Durbin et al. | 706/60 |
| 5,058,043 A | * 10/1991 | Skeirik | 56/10.5 |
| 5,412,806 A | * 5/1995 | Du et al. | 707/2 |
| 5,544,355 A | * 8/1996 | Chaudhuri et al. | 707/2 |
| 5,546,576 A | * 8/1996 | Cochrane et al. | 707/2 |
| 5,590,322 A | * 12/1996 | Harding et al. | 707/4 |
| 5,600,831 A | * 2/1997 | Levy et al. | 707/2 |
| 5,724,569 A | * 3/1998 | Andres | 707/2 |
| 5,875,440 A | * 2/1999 | Cooperman et al. | 706/50 |
| 5,899,991 A | * 5/1999 | Karch | 707/5 |

OTHER PUBLICATIONS

Jess, The Java Expert System Shell, Sand98–8206 (revised) Unlimited Release First Printed Nov. 1997, Ernest J. Friedman–Hill, Distributed Computing Systems, Sandia National Laboratories, Livermore, CA.*

VXI Plug & Play, Systems Alliance, VPP–4.3 Revision History (Revision 1.0, Dec. 29, 1995.*

Scalable Software Libraries, Don Batory; Vivek Singhal; Marty Sirkin; Jeff Thomas; SIGSOFT : ACM Special Interest Group on Software Engineering, (1993) ACM Press, New York, NY, USA, pp. 191–199.*

Query Evaluation Techniques for Large Databases, Goetz Graefe; ACM Press, New York, NY, USA, (1993) ACM Computing Surveys, vol. 25, No. 2, Jun. 1993, pp. 73–169.*

* cited by examiner

Primary Examiner—Thomas Black
Assistant Examiner—Michael B. Holmes
(74) Attorney, Agent, or Firm—Kaplan & Gilman, LLP

(57) ABSTRACT

A system of rules described which allows for generic rules to be customized and utilized in specific environments on a dynamic and specific basis.

12 Claims, 2 Drawing Sheets

SYSTEM OF GENERATING AND IMPLEMENTING RULES

TECHNICAL FIELD

This invention relates to artificial intelligence, and more particularly, to a rules based system and a technique of customizing and implementing rules which increases the efficiency of operation of these rules.

BACKGROUND OF THE INVENTION

Rules based systems have become prevalent as a technique of managing complex business, database and logistical systems over the past several years. Prior art systems implementing techniques of generating and updating rules in an exemplary database management system are described in U.S. Pat. Nos. 5,875,440 and 5,899,991, ("the '440" and '991 patent, respectively) owned by the Assignee of the present invention. Another prior art reference discussing the use of a knowledge engineering tool containing a plurality of "if then" rules is described in U.S. Pat. No. 4,970,658 to Durbin. The Durbin system selects rules from a knowledge base and routes those rules to object processors having access to the objects referenced in the rule. However, this results in a large number of rules being executed since every time an object is encountered that has access to the rules, the rules must fire. This results in wasted overhead in terms of processing power, etc. Additionally, the rules are difficult to update and manipulate.

Artificial intelligence is sometimes used in data access management and data warehousing. In these fields of endeavor, it is desirable to have a system which prohibits problematic data access, and allows the database to be accessed and managed in a manner that does not result in significant decreased performance. Additionally, any such systems should provide for flexibility that these rules systems as applied to database management should preferably learn as transactions take place. Accordingly, there is a need for an efficient rules systems for managing problems such as, for example, database access, which can learn and manipulate its rules but which does not result in significant degradation of performance through the use of extensive amounts of processing power.

SUMMARY OF THE INVENTION

The above and other problems of the prior art are overcome in accordance with the present invention which relates to a system which uses a series of rule templates to generate specific rules. In accordance with a preferred embodiment of the invention, the rules may be fired based upon certain items in the problem domain object or values of attributes associated therewith. Moreover, the rules may be dynamic and periodic, and may fire only at selected times when selected conditions are present.

DETAILED DESCRIPTION OF THE PREFERRED EMBODIMENT

Figure 1:
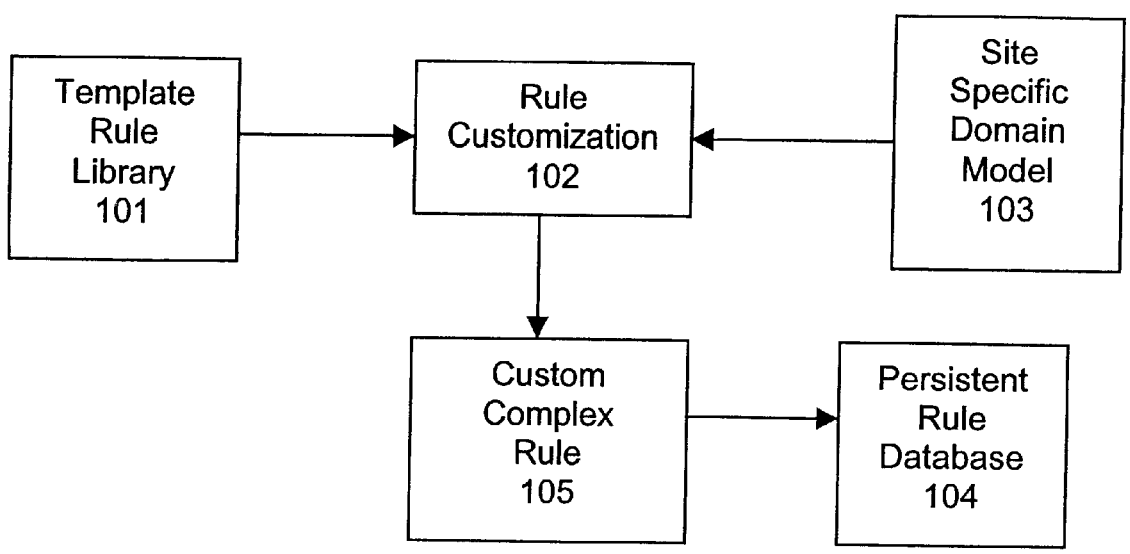
FIG. 1 displays a conceptual block diagram of a system of generating customized rules from rules templates in accordance with the teachings of the present invention.

FIG. 1 shows a high level conceptual diagram of a rules systems in accordance with the present invention. FIG. 1 includes a template rule library which consists of a plurality of predetermined template rules which have application in a variety of fields. For example, different individuals accessing data in a Structured Query Language (SQL) database may have different privileges regarding access to different columns of a particular table. One such situation would be an employee information database, wherein columns related to an employee's extension at work and other innocuous data may be accessable to most or all other employees, but sensitive data such as salary, health history, home address, etc. would only be available to certain qualified employees.

A set of rules relevant to the object "column" may be utilized in both situations, and may be stored in generic but unusable form in template rule library 101. The rules would have to be adjusted to have different specific parameters, but general rules that reference a generic column object without knowledge of what columns actually exist could be used as the basis for providing access management in such systems.

A site specific domain model 103 is utilized to indicate the particulars of the problem being solved. For example, the site specific domain model could include information regarding the specific columns that exist in a given environment. An additional but different site specific domain model may include specific items necessary to assign users to specific business roles for the purpose of authorization.

The function of the rule customization process is to receive inputs from the template rule library and the site specific domain model, customize those rules, and output them as a set of customized complex rules 105 which are stored in a rule database 104. There is nothing that prevents the rule database 104 from being updated and changed in the specific domain model in accordance with techniques described in the '440 and '991 patents incorporated herein by reference.

When the rule system is executed, rules from the persistent rule database may be executed periodically, and the rule customization algorithm 102 may be run on an as-needed, periodic, or one time basis only. Additionally, certain conditions present in the object upon which the rules are operating may be utilized to trigger the generation of customized rules based upon the template rule library 101 and site specific domain model 103.

In another embodiment, the rules from the persistent rule database may be fired only upon certain changes to particular objects being operated upon. Additionally, the rules may be set up to operate on particular objects or particular changes in objects present in the problem domain.

In another embodiment, a periodic or dynamic application of complex rules is applied by customizing and executing the rules on a periodic basis. Additionally, the persistent rule database may fire rules at certain predetermined time separations. Moreover, the rule customization algorithm may be invoked with different site specific domain models at different times. For example, during the first execution of the rule customization algorithm 102, it may operate on the template rule library 101 with a first specific site domain model 103 to generate a custom complex rule 105. At the next predetermined instance of time, the template rule library may utilize the same general rule with a different site specific domain model to be customized and create a custom complex rule 105. Other variations are possible as well.

Additionally, the processing of template rules with site-specific domain information may occur whenever a predetermined event occurs, rather than on a known time periodic basis. The predetermined event could be dynamically determined based upon a rule. For example, a custom rule is created that determines what event will trigger processing of the template rule, and the event that so triggers processing may vary as a function of time.

Additionally the rule that dynamically determines the triggering event could itself be a customized template rule.

In additional and more flexible embodiments, the specific rules 104 generated may in fact include the firing of other specific rules 104, the generation of custom complex rules, or other items specific to each of these processes. For example, a specific rule 104 that is generated may require a particular rule generation process to occur at specific times. The generated specific rule could require that a specified template rule be utilized every hour, on the hour, in order to generate a new specific rule to govern an item of conduct. Each hour, the template rule would be combined with different site specific domains models 103, depending upon conditions present at the time the rule which requires rule generation fires. Alternatively, the template rule and the site specific domain models used each hour may vary. Thus, a single rule can result in numerous specific rules being generated from a rule template combined with other site specific domain models.

Figure 2:
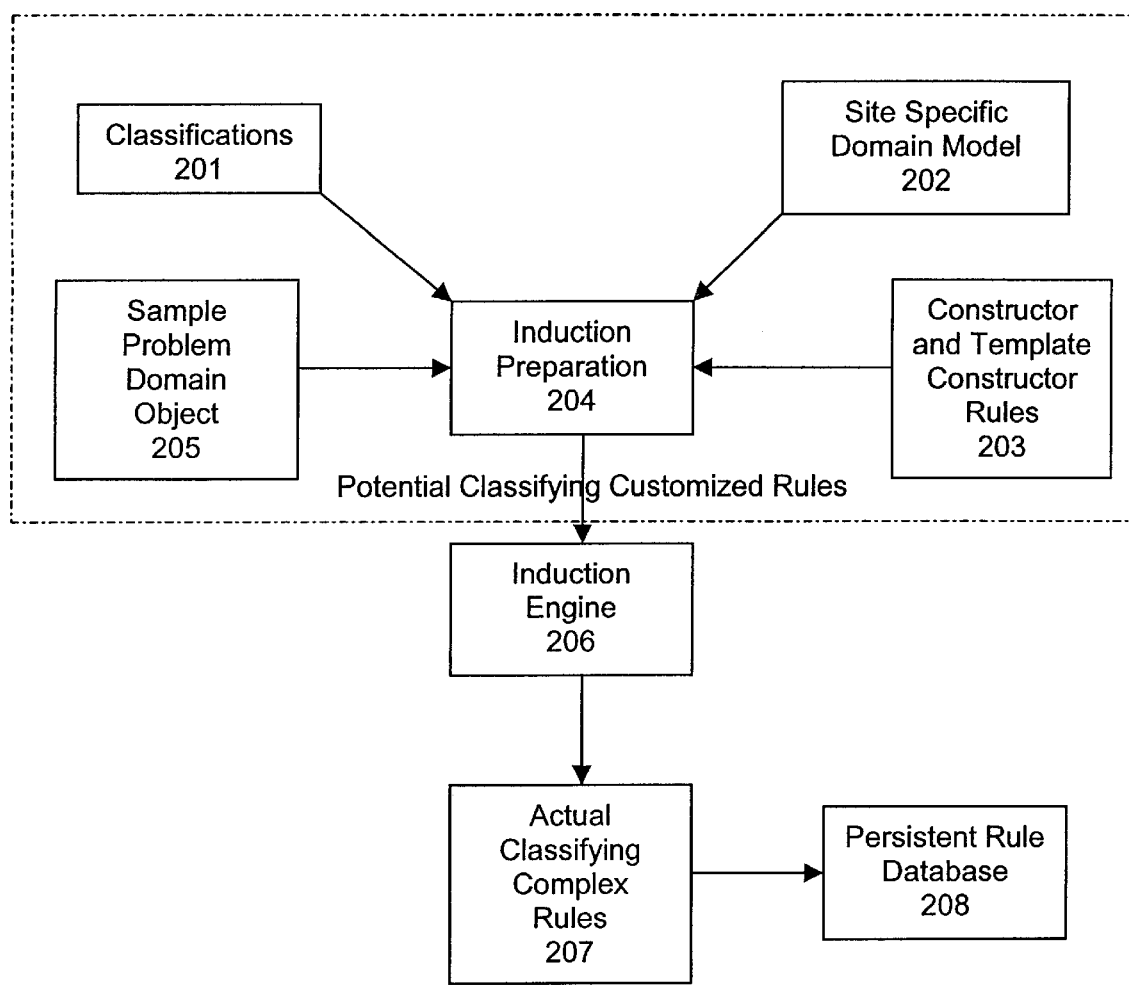
FIG. 2 shows an additional embodiment of the present invention.

FIG. 2 indicates an additional conceptual arrangement for implementing a rule generation system in accordance with an additional embodiment of the invention. In accordance the arrangement of FIG. 2, an induction preparation block 204 is utilized to generate custom rules from rule templates 203 in a manner similar to that described previously. Induction preparation 204 receives various domain objects 205, each of which includes a parameter that falls within one of several classes. The classes 201 are also input to the induction preparation block 204 as well as site specific domain model information 202.

The induction preparation block 204 transforms the template rules into customized rules by (1) determining what characteristics of the various object samples may cause them to fall within certain classes, and determining the actual classes within which they fall; and (2) from such information, extracting the specific parameters from the sample domain object with which to supplement the template rules so that custom rules are generated at the output of induction preparation 204. For example, two exemplary rules are Join Table Is and Predicate Op Is. These rules look at tables joined to other tables and values of predicate operators, respectively. The predicate operator rule could specify values of a particular column, and a template rule could be customized by adding predicate operator clauses that identify queries specifying a particular column compared with a particular value.

The induction engine 204 then operates to select from the various customized rules which ones should be stored as persistent rules at block 208. The induction learning algorithm utilized in the system facilitates such selection.

What is claimed is:

1. A system of generating rules to be used in an artificial intelligence system comprising:
    a template rule library for storing generic unusable template rules that require parameters to be filled in prior to firing;
    a site specific domain model that includes information sufficient to fill in said parameters;
    means for merging the site specific domain model with the template rule library to generate custom rules; and
    means for storing and applying such custom rules.

2. The system of claim 1 wherein said custom rules are periodic in nature.

3. The system of claim 2 wherein at least one of said custom rules specifies that a template rule is to be merged with a site specific domain model to generate a new custom rule.

4. The system of claim 3 wherein said custom rule specifies that a specific template rule is to be processed at different times with different site specific domain models in order to generate new and different custom rules.

5. The system of claim 1 wherein said custom rules are such that they only fire based upon particular characteristics of a domain object being operated on.

6. A system for customizing rules from a rule template database comprising the steps of:
    determining, from a plurality of objects, criteria that causes said objects to be classified into different classes of a class structure;
    forming specific rules from template rules by combining said template rules with said determined criteria.

7. The system of claim 6 wherein said object is a database query.

8. The system of claim 7 further comprising means for selecting one or more of said formed rules to implement and to operate upon said database query.

9. The system of claim 8 wherein said rules are generated to fire periodically.

10. The system of claim 3 wherein said custom rule specifies that a specific template rule is to be processed with a site specific model if and when some other event occurs.

11. The system of claim 3 wherein said custom rule specifies that a specific template rule is to be processed if and when some other event occurs at a particular time.

12. The system of claim 1 wherein said custom rule specifies that different template rules are to be processed with the same site specific domain models periodically in order to generate new custom rules.

* * * * *